INVENTOR
STANLEY S. SPROUL
BY
Thomas M. Ferrill
ATTORNEY

April 5, 1960 S. S. SPROUL 2,932,020
RADAR INDICATING SYSTEM
Filed Feb. 10, 1954 4 Sheets-Sheet 2

INVENTOR
STANLEY S. SPROUL
BY
Thomas M. Farrell Jr.
ATTORNEY

INVENTOR
STANLEY S. SPROUL
BY
Thomas M. Terrill Jr.
ATTORNEY

United States Patent Office 2,932,020
Patented Apr. 5, 1960

2,932,020
RADAR INDICATING SYSTEM

Stanley S. Sproul, Cato, N.Y., assignor to Sperry Rand Corporation, a corporation of Delaware Application February 10, 1954, Serial No. 409,498

14 Claims. (Cl. 343—7.9)

This invention relates to a radar indicating system, and more particularly to an indicating system having a two dimensional screen on which is indicated the position of objects in space as to three coordinates.

In display apparatus used for indicating the position of an object in space, the relation of the object to a fixed point must be given in three coordinates. In radar equipment polar coordinates are usually used and the three coordinates are elevation, range and azimuth or traverse. Azimuth and traverse bear a close relation to each other. Azimuth is angular movement by the scanning beam about a vertical axis. Traverse scanning is angular movement by the beam about an axis perpendicular to the elevation axis and to the beam or to the median direction of the beam, if it is scanning in elevation. Azimuth and traverse become equal at 0° elevation.

It is also customary to indicate the target position on the substantially flat screen of a cathode ray tube. Whether the radar equipment is being used for gun laying, early warning, as a navigational aid, for blind landing, or for some other purpose, the radar indication must be quickly and accurately translated into target position and made a basis for action.

One method of displaying the three coordinates of volumetric position on an oscilloscope screen is that of representing traverse along the horizontal and range along the diagonal to depict a series of vertically displaced oblique areas representing a series of flat thin vertically displaced sections of the volume scanned in space. It is a simple matter to cause the vertical displacement of these oblique areas by a stepped deflection wave provided by a commutator, or switches associated with the axis of elevational scan. However, these simple methods give rise to close tolerance on the gearing between mechanical parts, noise from rubbing contacts, brush smear and wear, complicated alignment procedures, and to inaccuracies due to the finite time required for voltages to reach their final level.

It is an object of this invention to provide a stepped deflection wave accurately synchronized with the position of a scanning component.

It is an object of this invention to provide a means for depicting display areas accurately spaced in accordance with the motion of a scanning component.

It is an object of this invention to provide a means for deflecting a cathode ray beam in discrete steps in synchronism with a scanning component with a minimum of alignment being necessary and without being affected by the finite time required for voltages to arise to their final level.

These and other objects will become apparent to those skilled in the art from a consideration of the following specification, taken in consideration with the accompanying drawings in which, Fig. 1 is a block diagram of a radar system embodying the present invention;

Figure 1:
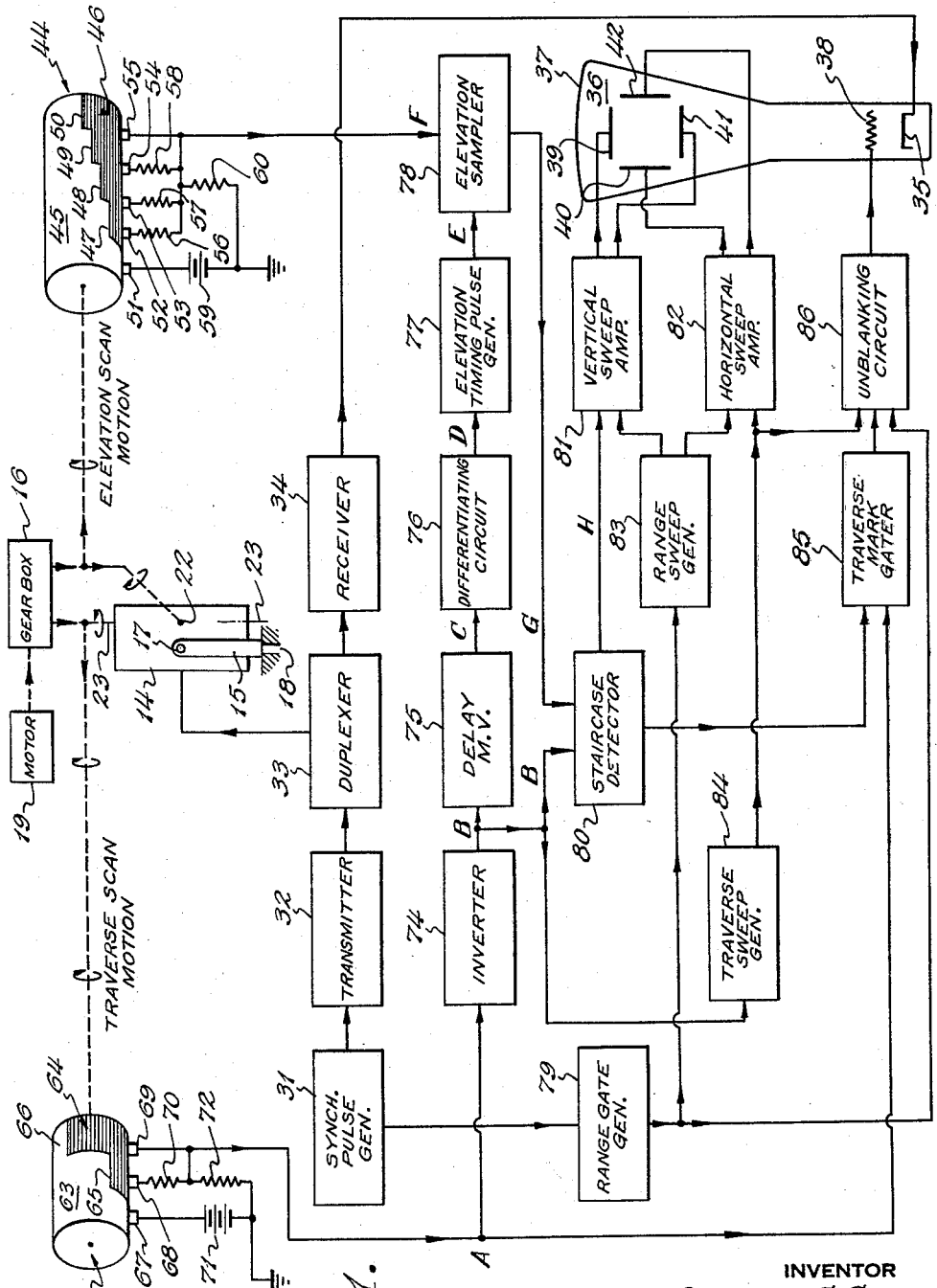

In the radar system shown in Fig. 1 there is provided an antenna component 14 which may be any kind of a radiator that will radiate a directive beam of radio frequency energy through space and which will cause that directive beam to scan angularly through a few degrees in elevation and in traverse.

Antenna 14 is arranged so that its beam oscillates continually through approximately five or ten degrees about elevation scan axis 22 at a relatively slow rate and through approximately five or ten degrees about traverse scan axis 23 at a relatively fast rate. The angular oscillation about the axis 22 gives an elevational scan and the angular oscillation about the axis 23 gives the traverse scan. Antenna 14 is mounted for rotation about a horizontal axis 17 in a yoke 15 which is mounted for rotation about a vertical axis 18. Horizontal axes 17 and 22 could be made coincident.

Figure 2:
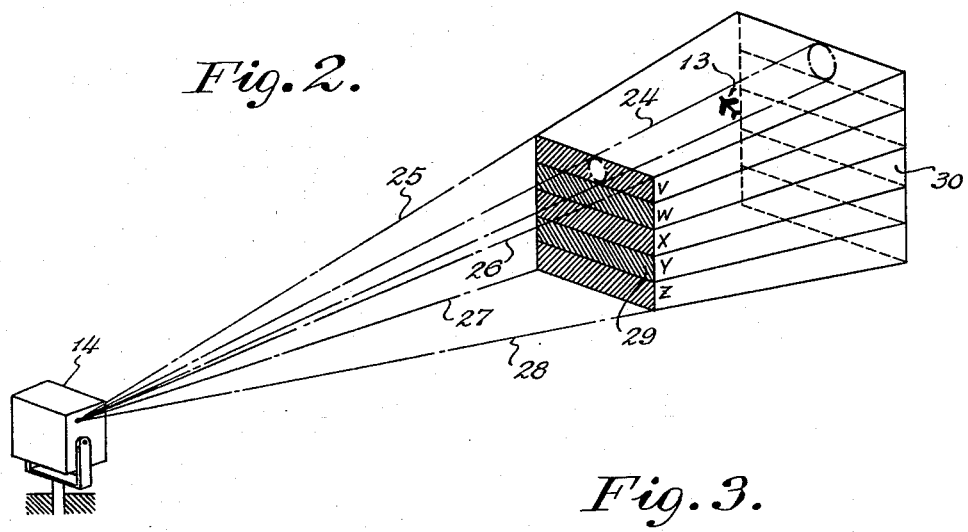
Fig. 2 is a perspective view illustrating the manner in which the radar antenna of Fig. 1 scans a volume in space.

Fig. 2 shows the manner in which the antenna 14 scans the volume in space in elevation and traverse about elevation and traverse axes 22 and 23. The directive beam 24 sweeps through a substantially pyramidal volume bounded by the lines 25, 26, 27 and 28 by a series of elevationally displaced traverse sweeps. By the rotation about the horizontal and vertical axes 17 and 18, the scanned volume 25—26—27—28 can be oriented in any direction.

Figure 3:
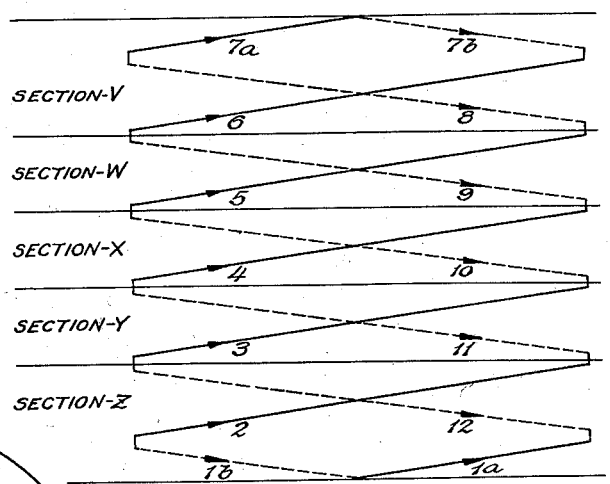
Fig. 3 is a plot showing the manner in which the radar antenna scans in elevation and in traverse.

While the volume in space may be scanned by many types of elevational and traverse motion of the directional beam 24, Fig. 3 sets forth a preferred manner of scanning on which the present specification is based. In the type of scanning shown in Fig. 3, the beam 24 is given a relatively slow elevational scanning motion about axis 22 in simple harmonic motion and is caused to scan in traverse by being moved slowly from left to right and then back very quickly to again scan slowly from left to right. The elevational and traverse scanning cycles of the antenna 14 are synchronized coming through a gear box 16 to each scanning mechanism from a common motor 19.

In practice it has been found satisfactory to use an elevation scan having a period of ½ second and a traverse scan having a period of 1/24 second. Since the shafts connecting the gear box 16 with the scanning motions in antenna 14 turn once for each scanning cycle, the elevation scan shaft turns at 120 r.p.m. while the traverse scan shaft turns at 1440 r.p.m.

The manner of effecting the oscillatory elevation and traverse scanning is not a part of this invention and is not described here in detail. However, many methods of providing such scanning are known to those skilled in the art. A preferred method is that of scanning in traverse by use of a Foster scanner described in Patent No. 2,521,844, to Gordy, granted September 12, 1950. The slower elevation scan in simple harmonic motion might be caused by tilting the Foster antenna bodily about a horizontal axis or, more advantageously, by oscillating a light reflector about a horizontal axis. It will be understood that the traverse scan shaft from gear box 16 would rotate the cone of the Foster scanner while the elevation scan shaft would oscillate the reflector about its horizontal axis as by a crank arm. Other suitable types of scanning means are set forth in Radar Scanners and Radomes, vol. 26 of the Radiation Laboratory Series, published by McGraw-Hill Book Co., in 1948.

Starting at the bottom of the chart in Fig. 3 and at the lowest part of the elevational movement of the beam 24, the beam starts upward along line 1a and then successively along lines 2, 3, 4, 5, 6 and 7a to reach the top of the elevational scan. It then starts down along line 7b and successively along lines 8, 9, 10, 11, 12 and finally through 1b to again reach the lowest part of the elevational scan. In Fig. 3 the solid lines indicate the traverse scans made during the upward part of the elevational scan while the dotted lines indicate the traverse scans made during the downward elevational sweep. As will be explained later, sections V, W, X, Y, Z of Fig. 2 are scanned as indicated between the horizontal lines in Fig. 3.

The antenna 14 is connected through a duplexer 33 to a receiver 34 and also to a transmitter 32 which is controlled by synchronizing pulse generator 31.

Duplexer 33 is an electronic switch which upon receiving a high powered pulse of radio frequency energy from the transmitter 32 will conduct it to the antenna 14 and will not apply it to the receiver 34. However, duplexer 33 upon receiving a low power echo from antenna 14 will apply it to receiver 34 to the exclusion of transmitter 32.

Transmitter 32 is an oscillator capable of generating high powered pulses of radio frequency energy, preferably in the microwave region. Synchronizing pulse generator 31 generates short pulses which modulate and control in time the emission of pulses by the transmitter 32. Receiver 34, also connected to duplexer 33, is a receiver from microwave radio energy and is capable of converting such energy into amplified video frequencies. Receiver 34 normally would contain radio frequency stages, a local oscillator, a mixer stage, intermediate frequency stages, detector and video frequency amplification stages.

The output of receiver 34 is applied to the cathode 35 of cathode ray tube 36. Cathode ray tube 36 has a screen 37, a control grid 38, vertical deflecting plates 39 and 41, and horizontal deflecting plates 40 and 42.

Also driven by the elevation scan shaft, which causes the elevation scanning of antenna 14 is a commutator generally indicated by reference numeral 44. Commutator 44 makes one rotation for each complete cycle of elevation scan by the antenna 14.

The portion 45 of commutator 44 is made of a conducting material while the portion 46 is made of an insulating material. The boundary of portions 45 and 46 of commutator 44 includes the steps 47, 48, 49 and 50. Brushes 51, 52, 53, 54 and 55 bear upon the surface of commutator 44 and are arranged in a line parallel to its axis. Brush 51 bears upon the end of commutator 44 which is entirely composed of conductive material 45. Brush 52 is in line with the step 47, and bears upon the insulating material 46 for a portion of the revolution of commutator 36. Brushes 53, 54 and 55 are respectively in line with the steps 48, 49 and 50, and bear upon the insulating material 46 for increasingly longer times in the order set forth. Brush 51 is connected through battery 59 to ground. Brushes 52, 53 and 54 are respectively connected each to one end of resistors 56, 57 and 58. The other ends of resistors 56, 57 and 58 are connected together and to brush 55, and this junction is connected through resistor 60 to ground.

Resistors 56, 57 and 58 have a decreasing value of resistance in the order named. The junction of resistors 56, 57, 58 and brush 55 is connected to elevation sampler 78, the circuit of which will be explained more in detail later.

Commutator 62 is driven by the traverse scan shaft which causes the traverse scanning of the antenna 14. Commutator 62 makes one complete revolution for each complete traverse scan by the antenna 14. The portion 63 of commutator 62 is made of conducting material while the portion 64 is made of insulating material. The boundary between the portions 63 and 64 comprises steps 65 and 66. Three brushes 67, 68 and 59 bear against the surface of the commutator 62 and are arranged in a line parallel with its axis. Brush 67 is connected to ground through a battery 71. Brush 68 is connected to ground through resistor 70 and resistor 72. Brush 69 is connected to ground only through resistor 72. The junction of resistor 70, resistor 72 and the brush 69 is connected to the input of inverter 74.

Inverter 74 contains an inverting device, which may be one stage of amplification, for inverting the voltage wave produced by commutator 62. Inverter 74 is operated at such a bias that the negative pulse of the inverted wave, appearing at the center of the traverse scan, is eliminated. The inverted wave produced by component 74 is applied to delay multivibrator 75 in which the positive pulses of this inverted wave are used to trip a multivibrator, producing short duration pulses. These short pulses from delay multivibrator 75 are applied to the input of differentiating circuit 76 where a positive spike is produced at the leading edges of the pulses and a negative spike is produced at the trailing edges.

The output of differentiating circuit 76 is applied to elevation timing pulse generator 77. Elevation timing pulse generator 77, which also may be a multivibrator circuit, produces a short duration positive pulse upon the application thereto of the negative spike from the differentiation circuit. These latter short duration positive pulses, coinciding in time with the trailing edges of the pulses produced by the multivibrator 75 are applied to an input of elevation sampler 78.

Elevation sampler 78 is essentially a coincidence circuit and may be a tetrode having inputs connected to its control and screen grids, respectively. One input is a stepped wave from commutator 44. On the occurrence of one of the pulses from elevation timing pulse generator 77 the elevation sampler 78 produces an output pulse which corresponds in amplitude to the instantaneous voltage being produced by the commutator 44. The output of the elevation sampler 78 is applied to staircase detector 80, the details of which will be explained below. The voltage wave from commutator 62 as inverted by the inverter 64 is also applied to the staircase detector 80.

Pulses from synchronizing pulse generator 31 are applied to the range gate generator 79 which produces a pulse in response to each pulse from the synchronizing pulse generator, and of a width corresponding to the portion of range desired to be indicated on cathode ray tube 36. Range gate generator 79 may include a delay multivibrator, the delay of which can be adjustably varied so that the range gate pulse produced will have the same period as the synchronizing pulse generator pulses but will be delayed in time therefrom.

The range gate pulse produced at the output of range gate generator 79 is applied to range sweep generator 83, which produces a sawtooth sweep wave synchronous with the pulses applied thereto and having a duration equal to that of the supplied pulses. The deflection wave produced by range sweep generator 83 is applied through vertical sweep amplifier 81 and horizontal sweep amplifier 82 respectively to vertical deflecting plate 41 and to horizontal deflecting plate 40 of the cathode ray tube 36.

The traverse synchronizing signal produced by commutator 62, after being inverted by component 74, is applied to traverse sweep generator 84 which provides a sawtooth deflection wave synchronously with each traverse scan of the antenna 14. The deflection wave produced by the traverse sweep generator 84 is applied through the horizontal sweep amplifier 82 to horizontal deflection plate 42 of cathode ray tube 36.

The circuit of the staircase detector 80 is arranged to supply a pulse to traverse mark gater 85 during the central portion of each elevation scan. The exact nature of this pulse and the manner of producing it will be described more in detail later. Commutator 62 supplies to traverse mark gater 85 a positive pulse at the center of each traverse scan. Traverse mark gater circuit 85 is essentially a coincidence circuit and provides at its output a gating pulse when the two pulses supplied to its input coincide. The traverse mark gater circuit may be a tetrode, having one input applied to its control grid and one input applied to its screen grid. The output of traverse mark gater 85 is applied to the unblanking circuit 86.

The output of traverse sweep generator 84 is also applied to the input of unblanking circuit 86 as is the output of range gate generator 79. Unblanking circuit 86 is a combining and amplifying circuit which supplies to the grid 38 of cathode ray tube 36 unblanking pulses causing the cathode ray to make a more or less visible trace on the screen 37. The unblanking pulses resulting from the waves supplied component 86 by the traverse sweep generator 84 and the range gate generator 79 are sufficiently positive to cause a visible trace. The unblanking pulse resulting from the wave supplied by traverse mark gater 85 is more positive to cause an intensified visible trace.

The circuitry of staircase detector 80 will now be explained more in detail. In staircase detector 80 there are four sections which are substantially the same. Each section has a diode 91, 92, 93 and 94. Each section has an amplifying triode 96, 97, 98 and 99, an elevation shut-off tube 100, 101, 102 and 103, and a multivibrator having two stable states, each comprising two triodes 105—110, 106—111, 107—112 and 108—113.

The pulses supplied by elevation sampler 78 are applied to the cathodes of diodes 91, 92, 93 and 94. The anodes of diodes 91, 92, 93 and 94 are respectively connected to ground through resistors 115, 116, 117 and 118 and to minus battery through resistors 120, 121, 122 and 123. Resistors 115, 116, 117 and 118 have an increasing value of resistance in the order named. The anodes of diodes 91, 92, 93 and 94 are respectively connected through condensers 124, 125, 126 and 127 to the control grids of tubes 96, 97, 98 and 99. The plates of tubes 96, 97, 98 and 99 are respectively connected through condensers 128, 129, 130 and 131 and through resistors 132, 133, 134 and 135 to the control grids of the first of the multivibrator tubes 105, 106, 107 and 108. The plates of the second multivibrator tubes 110, 111, 112 and 113 are connected through suitable resistors together and the junction is connected to B— through resistor 114, to ground through resistor 115, and to the input of the vertical sweep amplifier 77.

The inverted traverse synchronizing pulse produced by component 74 is connected through condenser 95 to the control grids of the elevation shut-off tubes 100, 101, 102 and 103. The junction of condenser 95 and the control grids is connected to B— through resistor 104 and to ground through resistor 109. Elements 95, 104 and 109 form a differentiation circuit.

The plate of the second multivibrator tube 111 and the plate of the first multivibrator tube 107 are each connected through a suitable resistor to an output junction which is connected through resistor 119 to minus battery and to one input of traverse mark gater 85.

In the operation of the radar system shown in Fig. 1, the directional, pulsed radio search beam 24 produced by antenna 14 continuously scans in traverse and in elevation a volume of space as best seen in Fig. 2. When these outgoing search pulses encounter a reflecting object 13, an echo is received by the antenna 14 which is passed through the duplexer 33, and the receiver 34 to the cathode 35 of the cathode ray tube 36 causing a visible trace 13' to appear on the screen 37, but only during the time when the unblanking circuit is supplying to the control grid 38 an enabling pulse.

The range gate produced by component 79 under control of the synchronizing pulse generator 31 causes a sawtooth range sweep wave to be developed by range sweep generator 83, which is applied through vertical sweep amplifier 81 and horizontal sweep amplifier 82 respectively to vertical deflecting plate 41 and horizontal deflecting plate 40, to cause a diagonal range sweep to appear on screen 37 of cathode ray tube 36. This diagonal range coordinate is represented by the diagonal edge 136 of the uppermost elevation plane V shown in Fig. 4.

Figure 6:
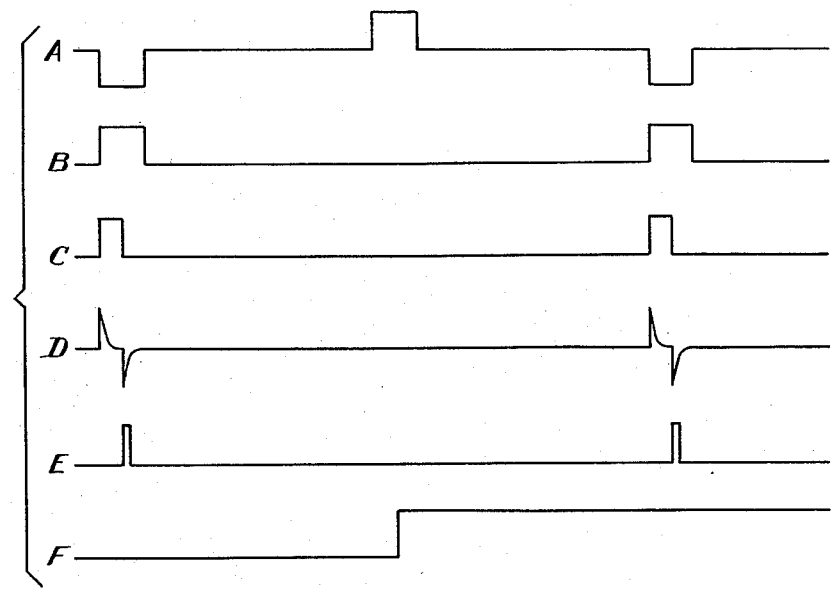
Figs. 6 and 7 show waveforms useful in explaining the operation of this invention.

The commutator 62 of Fig. 1 produces a voltage wave shown at A in Fig. 6, a negative pulse at the beginning of each traverse scan. This waveform is inverted and the middle pulse is eliminated in inverter 74 to produce waveform B of Fig. 6. The leading edges of the positive pulses of waveform B cause delay multivibrator 75 to operate and produce waveform C of Fig. 6. Waveform C of Fig. 6 is differentiated by component 76 to produce waveform D of Fig. 6. The negative pulses of waveform D, which are coincident with the trailing edges of the pulses in waveform C produced by the multivibrator 75, cause elevation timing pulse generator 77 to operate and produce the pulses shown in waveform E. These timing pulses produced by component 77 are thus coincident with the trailing edges of the pulses produced by the delay multivibrator 75 shown in waveform C.

Figure 7:
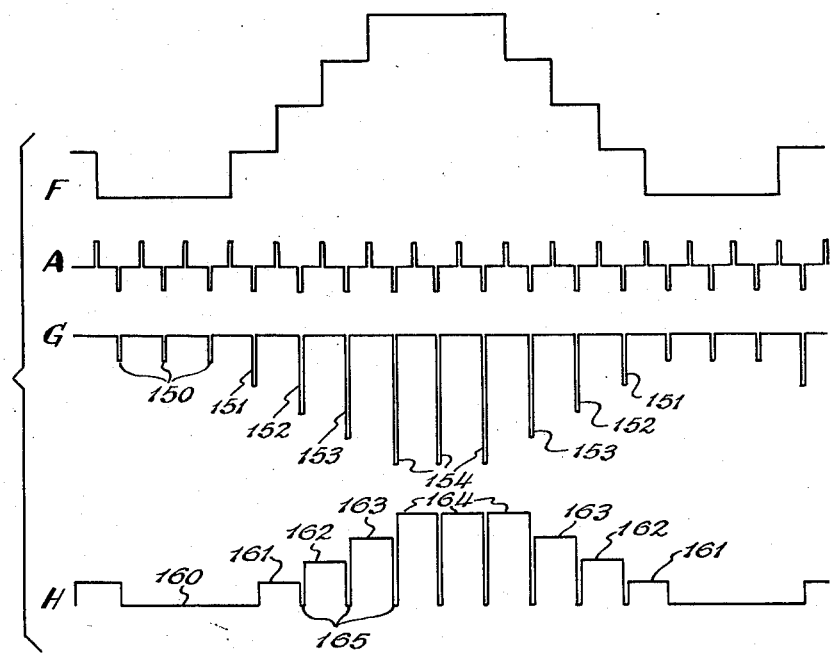

Commutator 44 produces a voltage wave such as is shown partially in waveform F of Fig. 6 on an expanded scale. This waveform produced by commutator 44 is shown in its entirety as waveform F of Fig. 7. As will be seen, the waveforms of Fig. 7 are on a different time scale from those in Fig. 6. Waveform A of Fig. 7 corresponds to waveform A of Fig. 6. Waveform E from the elevation timing pulse generator 77 and waveform F from the commutator 44 are both applied to elevation sampler 78, which produces at its output waveform G of Fig. 7, a series of pulses corresponding in time to the pulses of waveform E and corresponding in amplitude to the instantaneous voltage level of waveform F.

Waveform B from inverter 74 and waveform G from elevation sampler 78 are both applied to staircase detector 80 which, by an operation to be explained more in detail below, produces one output as shown in the voltage waveform H in Fig. 7. This output is a series of increasing and then decreasing voltage pulses which are applied through vertical sweep amplifier 81 to the vertical plate 39 of the cathode ray tube 36. These pulses of waveform H cause the diagonal sweep applied to the deflection plates 40 and 41 to be successively displaced in a vertical direction from the bottom to the top of screen 37 and back to the bottom in synchronism with the elevational scanning of the antenna 14 as shown in Fig. 3.

Waveform B of Fig. 6, the inverted traverse synchronizing pulses from the commutator 62, is applied to the traverse sweep generator which produces a sawtooth traverse sweep wave. This wave is amplified in horizontal sweep amplifier 82 and applied to horizontal deflecting plate 42 to cause the cathode ray tube trace to be deflected horizontally. The traverse coordinate is represented by the horizontal edge 143 of the uppermost elevation plane V shown on the screen 37 in Fig. 4.

Figure 4:
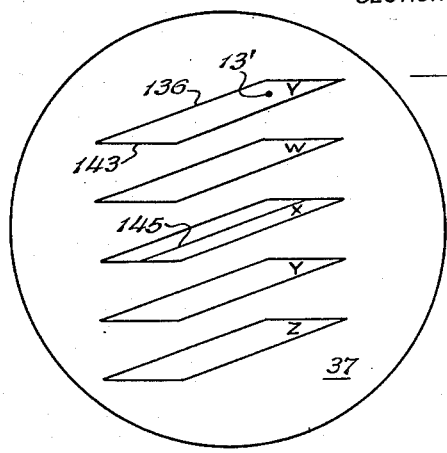
Fig. 4 is an elevation view of the screen of an oscilloscope indicating the position of an object in three coordinates in accordance with this invention.
Figure 5:
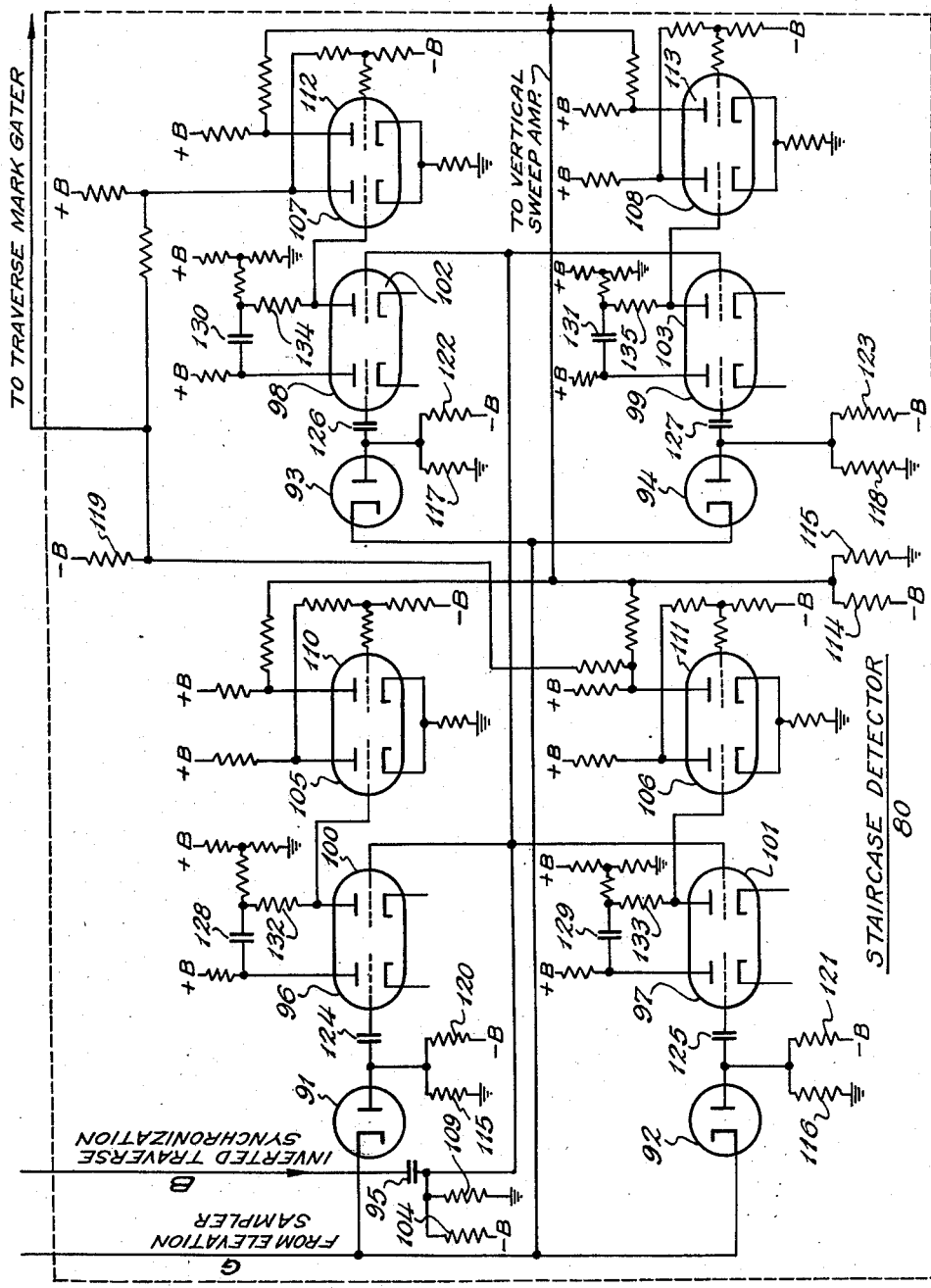
Fig. 5 is a schematic diagram of the staircase detector used in Fig. 1.

The operation of staircase detector 80 will now be explained more in detail. The elevational sampling pulses shown in waveform G of Fig. 7 are applied to the cathodes of diodes 91, 92, 93 and 94. The anodes of diodes 91, 92, 93 and 94 are each differently biased and to an ever-increasing potential in the order named. The shortest sampling pulses 150 of waveform G in Fig. 4 are not of sufficient amplitude to cause any of the diodes 91—94 to conduct. Under this condition, the first multivibrator tubes 105, 106, 107 and 108 are extinguished and the second multivibrators 110, 111, 112 and 113 are conducting. This means that plates of second multivibrator tubes 110, 111, 112 and 113, which are connected through suitable resistors to the vertical sweep amplifier, are at their lowest voltages and the lowest voltage level indicated at 160 in waveform H of Fig. 7 is being applied to the vertical deflecting plate 39. This causes the trace of cathode ray tube 36 to scan plane Z.

Pulse 151 of waveform G, the next longest pulses in amplitude, are applied to the cathodes of diodes 91—94. They are sufficient in amplitude to cause diode 91 to conduct the pulse through condenser 124 to the grid of amplifying tube 96. This produces a positive pulse in the plate of tube 96 which is conveyed through condenser 128 and resistor 132 to the grid of first multivibrator tube 105 causing that tube to strike and causing the second multivibrator tube 110 to extinguish. This applies full B+ from the plate of triode 110 to the resistor network including resistors 114 and 115, and raises the voltage applied to the vertical sweep amplifier 81 as represented by the voltage level 161 in waveform H of Fig. 7. This voltage applied to vertical deflection plate 39 causes the trace in cathode ray tube 36 to scan plane Y.

Just before the arrival of the next higher pulse in amplitude, pulse 152 of waveform G in Fig. 7, the inverted traverse synchronizing pulse, waveform B of Fig. 6, is applied through differentiating circuit 95—104—109 to the grids of all the shut-off tubes 100, 101, 102 and 103. Differentiating circuit 95—104—109 produces a positive spike coincident in time with the leading edge of the postive pulses of waveform B. These postive spikes are inverted by shut-off tubes 100—103. This causes a short negative pulse to be produced at the plates of these tubes and to be applied to the grid of first multivibrator tube 105, causing this tube to extinguish and tube 110 to conduct. This action lowers the deflection voltage applied to the plate 39 to its lowest level, as seen at 165 in waveform H of Fig. 7. The precedence in arrival time of the leading edge of the traverse synchronizing pulse of waveform B over that of the voltage sampling pulse of waveform G is seen by a comparison of the timing of waveform B and E in Fig. 6. This delay is caused by delay multivibrator 75.

However, shortly after the voltage returns to its lowest level 165, sampling pulse 152 is applied to the cathodes of the diodes 91, 92, 93 and 94 and is of sufficient amplitude to cause conduction in diodes 91 and 92. This causes the first multivibrator tubes 105 and 106 to conduct and the second multivibrator tubes 110 and 111 to extinguish. Thus the plates of both tubes 110 and 111 apply full B+ to the resistor network including resistors 114 and 115 and apply a second higher level of voltage as shown at 162 in waveform H of Fig. 4 to deflection plate 39. This causes the trace of cathode ray tube 36 to scan the middle elevation plane X.

Elevation sampling pulses 153 are of sufficient amplitude to cause diodes 91, 92 and 93 to conduct. This causes first multivibrator tubes 105, 106 and 107 to conduct and second multivibrator tubes 110, 111, 112 to extinguish, applying the still higher voltage level shown at 163 in waveform H of Fig. 7 to the vertical deflection plate 32, causing plane W to be scanned on screen 37. As explained above, the voltage level applied to the deflection plate 39 returns to its lowest level just before the application of each sampling pulse.

The highest sampling pulses 154 in waveform G are of sufficient amplitude to cause all four diodes 91, 92, 93 and 94 to conduct, causing second multivibrator tubes 110—113 to extinguish, applying the highest voltage level, that shown at 164 of waveform H, to the vertical deflecting plate 39. This causes the top elevational plane V in Fig. 4 to be scanned.

When the middle elevational plane X is being scanned on screen 37 the voltage applied to vertical deflecting plate 39 is at the level shown at 162 in waveform H of Fig. 7. When this voltage level is being supplied by the staircase detector 80, second multivibrator tube 111 is extinguished, and first multivibrator tube 107 is extinguished. This condition applies, from the output junction connected to B+ through resistor 119 and the connections to the plates of triodes 111 and 107, the maximum possible voltage to input of the traverse mark gater from the staircase detector. When, under this condition, a positive traverse synchronizing pulse as shown in waveform A of Fig. 6 is applied to the other input of the traverse mark gater, a positive pulse will be produced in the output of the traverse mark gater. This positive pulse is applied to the unblanking circuit and will cause an intensified range trace 145 to appear in the center of the middle elevational plane X. This electronic fiduciary line is useful in orienting the antenna 14 so that the echo 13' is in the center of the traverse and elevation scans.

The output of the transverse sweep generator 85 is applied to the unblanking circuit 86 so that the cathode ray tube 36 can make a visible trace on the screen 37 only during the center portion of the traverse as between the negative pulses shown in waveform A of Fig. 6. This allows time for the fast return of the traverse scanning sweep by the antenna sweep. It may also be desirable to shut off the operation of transmitter 32 during this traverse sweep return.

If antenna 14 is oriented about the horizontal and vertical axes 17 and 18 so that echo 13' is on line 145 of central plane X, then the beam produced by antenna 14 points directly at the target 13 giving the elevation and azimuth coordinates of the target. It will be obvious that a horizontal bright line could be placed across the center of line 145 of plane X by generating a positive unblanking pulse at the center of each range gate pulse and applying these pulses to the input of the traverse mark gater 85 which receives the traverse synchronizing pulse from commutator 62.

As explained above, the trace on screen 37 of cathode ray tube 36 makes a diagonal sweep for each search pulse emitted by antenna 14, and during that portion of the search pulse cycle which is desired to be scanned, as is set in range gate generator 79. As can be readily seen from waveform H of Fig. 7, three traverse scans on screen 37 occur in the upper elevational plane V and three traverse scans occur in the lower elevational plane Z. These relations between the traverse and elevational scans correspond with those shown in Fig. 3 where there are three complete traverse scans of antenna 14 included in the top plane V, three in the bottom plane Z and one in each of the intermediate planes W, X, and Y. It will readily be apparent that the elevational planes V, W, X, Y and Z on screen 37 represent successive elevational sections through the volume scanned, as shown in Fig. 2. Echo indication 13' of Fig. 4 is in the center, traversely, of the top plane V showing that the target 13 is at or near the top of the elevational scan and at or near the center of the traverse scan.

The system described above using the elevation sampling pulses and the staircase detector has the advantage of not requiring precise alignment between the commutator 44, the antenna 14 and the commutator 62. It eliminates the problems of close tolerance on the gearing between mechanical commutators, noisy commutation of the reference signals, brush smear and wear, and alignment procedure. In the system described above, it is only required that commutator 44 set a voltage level during the center portion of the duration of the commutator steps. The alignment of the beginning of these steps with the elevation scan becomes unimportant as does the time required for the voltage of waveform F of Fig. 7 to change from level to level. The precise time when the scanning of each plane on screen 37 is initiated is controlled by the relatively rapidly rotating commutator 62. The negative pulses of waveform A can be aligned with the initiation of each antenna traverse scan with relative ease.

While the invention in the embodiment here disclosed is employed to produce the stepped deflection wave for separating the scanned areas to indicate the elevation coordinate, it will be understood that the invention is not limited to this specific use but could be employed to show range in separate rectangles. Separated along the diagonal, elevation being represented by the vertical coordinate and traverse (or azimuth) by the horizontal coordinate. Moreover, traverse could be represented by a number of oblique parallelograms separated horizontally, elevation being represented along the vertical coordinate and range along the diagonal coordinate. The volume scanned could be represented on screen 37 as an isometric, or other type of, projection of the sections scanned in space.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, means for providing electrical energy in steps corresponding to an angular motion including means to provide a first series of discrete levels of electrical energy approximately synchronized with said motion, means for providing a series of timing pulses of short duration accurately synchronized with said motion, each delayed a predetermined interval after the initiation of one of said levels, and means for providing a second series of energy levels, each initiated synchronously with and in response to a timing pulse and having an amplitude commensurate with the energy level of said first series coincident in time with the initiating timing pulse.

2. In combination, means for scanning a volume in space by a relatively slow angular motion about one axis and by a relatively rapid angular motion about another axis, each of said angular motions bearing a relation to the other in speed and phase, means associated with the relatively slow angular motion about said one axis for providing a first series of discrete levels of electrical energy, means associated with the relatively rapid angular motion about said other axis to provide a series of timing pulses of short duration, each delayed a predetermined interval after the initiation of one of said levels, means providing a second series of energy levels each initiated synchronously with and in response to a timing pulse and having an amplitude commensurate with the energy level of said first series coincident in time with the initiating timing pulse, and means for applying said second series of energy levels to the deflecting means of a display component.

3. In combination detecting means for scanning a volume in space, said means having a cycle of angular motion about an axis, a first commutator actuated by said angular motion and providing a stepped wave for each of said cycles, a second commutator rotating at least once for each of said steps and at a speed bearing a relation to the speed of rotation of said first commutator, said second commutator and its associated circuits providing for each rotation at least one timing pulse delayed a predetermined interval after the initiation of one of said steps, means connected to the outputs of said first and second commutators for providing a series of energy levels, each initiated synchronously with and in response to a timing pulse and having an amplitude commensurate with the amplitude of the step coincident in time with the initiating timing pulse.

4. Means for providing electrical energy in steps corresponding to an angular motion including means to provide a first series of discrete levels of electrical energy approximately synchronized with said angular motion, means to provide a series of short duration timing pulses each delayed a predetermined time after the initiation of one of said levels and accurately synchronized with said angular motion, sampling means to provide a series of sampling pulses each synchronous with and generated in response to a timing pulse and having an amplitude commensurate with the level of said first series that is synchronous therewith, means connected to said sampling means to provide on the application thereto of a sampling pulse, a pulse of longer duration than said sampling pulse but having an amplitude commensurate therewith.

5. In radar apparatus, search means arranged to scan by a cycle of angular movement about at least one axis, first means associated with said angular movement to provide a first series of electrical energy levels synchronous with said cycle and approximately indicative of the instantaneous phase thereof, second means associated with said angular movement to provide a series of short duration electrical timing pulses accurately at predetermined points along said angular scan but delayed after the initiation of an energy level of said series, sampling means connected to said first and second means to provide a short duration sampling pulse synchronous with and generated in response to each of said timing pulses and having an amplitude commensurate with the instantaneous amplitude of the energy level of said first series coinciding in time with the timing pulse, means connected to the output of said sampling means to provide a second series of electrical energy levels each commensurate with the amplitude of the sampling initiating the level and beginning at a time synchronous with said sampling pulse, means applying said second series of energy levels to the deflecting means of a display component.

6. The combination of claim 5 in which there are provided means associated with said second means for producing a shut-off pulse of short duration preceding by a short interval each timing pulse, applying each of said shut-off pulses to said means for providing said second series of electrical energy levels to reduce the existing energy level in said second series to a base level.

7. The combination of claim 5 in which said display component includes an intensity control means and in which means are provided to cause said search means to scan by an angular movement about another axis, means associated with said movement about the other axis to provide an electrical marker pulse at the center of each scanning movement, means to provide an unblanking pulse during a selected one of the energy levels of said second series, and means to apply an intensifying pulse to the control means of said display component only when said unblanking pulse and said marker pulse coincide.

8. In a circuit for producing a series of discrete energy levels in one output, a plurality of multivibrator circuits each having two stable states and comprising two triodes each having a control grid, a cathode and a plate, input means connected to the grid of a corresponding one of each of said multivibrator triodes through a diode, each of said diodes being differently biased, the plates of a corresponding one of said multivibrator triodes being connected in a combining output circuit so that the application of an input timing pulse of sufficent amplitude to said diodes will cause the output circuit to provide a continuous energy level commensurate in amplitude with the amplitude of said input pulse.

9. The combination of claim 8 in which input means are provided to apply to the grid of a corresponding triode of each multivibrator a shut-off pulse preceding by a short interval each of said timing pulses, said shut-off pulses causing the multivibrators to operate in a certain of their states.

10. The combination of claim 8 in which the plate of one triode of one multivibrator is connected to a second combining circuit and in which the plate of the corresponding other triode of another multivibrator is connected to said second combining circuit to produce a certain level of output in said second combining circuit only when one multivibrator is in one state and the other multivibrator is in the other state.

11. In combination means for scanning a volume in space by relatively slow angular motion about one axis and by a relatively rapid angular motion about another axis, said two angular motions being related to each other in speed and phase, first means associated with the relatively slow angular motion about said one axis for providing a first series of discrete levels of electrical energy, second means associated with the relatively rapid angular motion about said other axis to provide a series of timing pulses of short duration, each delayed a predetermined interval after the initiation of one of said levels, sampling means connected to said first and second means to provide a short duration sampling pulse synchronous with each of said timing pulses and having an amplitude commensurate with the instantaneous amplitude of the energy level of said first series coinciding in time with the timing pulse, a plurality of multivibrator circuits each having two stable states and comprising two triodes each having a control grid, a cathode and a plate, means applying the sampling pulses to the grid of a corresponding one of each of said multivibrator triodes through a diode, each of said diodes being differently biased, the plates of a corresponding one of said multivibrator triodes being connected in a combining output circuit so that the application of a sampling pulse of sufficient amplitude to said diodes will cause the output circuit to provide a continuous energy level commensurate with the amplitude of said input pulse, means connecting said output circuit to the deflecting means of a cathode ray tube.

12. The combination of claim 11 in which input means are provided to apply to the grid of a corresponding triode of each multivibrator a shut-off pulse preceding by a short interval each of said timing pulses, said shut-off pulse causing the multivibrators to operate in a certain of their states.

13. The combination of claim 11 in which the plate of one triode of one multivibrator is connected to a second combining circuit and in which the plate of the corresponding other triode of another multivibrator is connected to said second combining circuit to produce a certain level of output in said second combining circuit only when one multivibrator is in one state and the other multivibrator is in the other state, means connecting said second output circuit to a control electrode of said cathode ray tube.

14. In combination, detecting means for detecting the position of an object in space by means of a pulsed beam of energy, means for causing said detecting means to move at a relatively slow rate rotationally about one axis, and at a relatively fast rate about another axis perpendicular to the first axis, to cause said beam to scan a volume in space, the motion about each axis being related to the motion about the other in speed and phase, first commutator means arranged for rotational movement in accordance with the relatively slow movement of said detecting means about one of said axes, said first commutator and its associated circuits being connected to give electrical energy in discrete steps in time relation with the movement of the detector about said one axis, second commutator means arranged for rotational movement in accordance with the relatively fast movement of said detecting means about its other axis and to give an electrical synchronizing pulse at a certain point of said last mentioned movement, means connected to said second commutator means for producing a timing pulse delayed by a short interval after each synchronizing pulse, means for sampling said voltage produced by said first commutator at a time coincident with the production of said timing pulses to produce sampling pulses coincident with said timing pulses and having an amplitude determined by the amplitude of the voltage produced by the second commutator at the sampling instant, means for producing electrical energy of an ampltiude determined by said sampling pulse, an indicating component having means for producing a visible trace and having two deflecting means for respectively deflecting said trace in two directions, means for applying said last mentioned electrical energy to one of said deflecting means, means for applying to said other deflecting means deflecting energy corresponding to the motion of said detecting means about its other axis, means for applying to both of said deflecting means deflecting energy in synchronism with the emission of the energy pulses in said beam, whereby said trace scans through a plurality of separate areas.

References Cited in the file of this patent

UNITED STATES PATENTS

| | | |
|---|---|---|
| 2,451,932 | Melhose | Oct. 19, 1948 |
| 2,474,266 | Lyons | June 28, 1949 |
| 2,486,391 | Cunningham | Nov. 1, 1949 |
| 2,544,669 | Goldstein | Mar. 13, 1951 |
| 2,648,061 | Parker et al. | Aug. 4, 1953 |